April 19, 1949.    W. D. HERSHBERGER    2,467,670
RADIO PULSE-ECHO SYSTEM USING DOPPLER EFFECT
Filed July 28, 1939
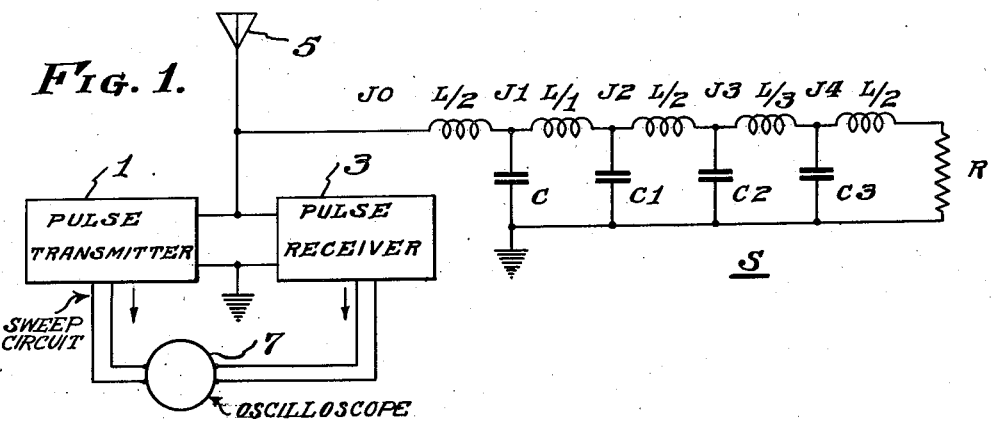
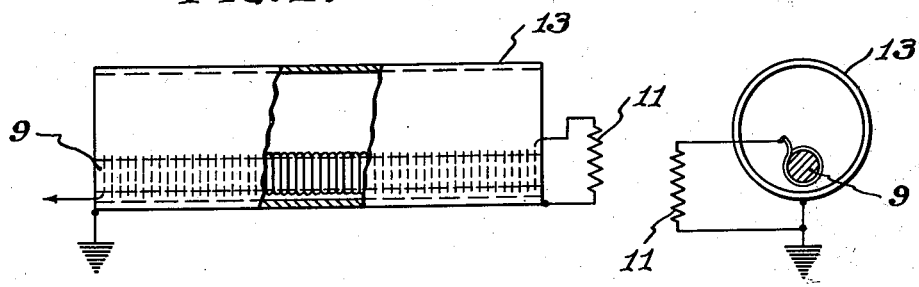
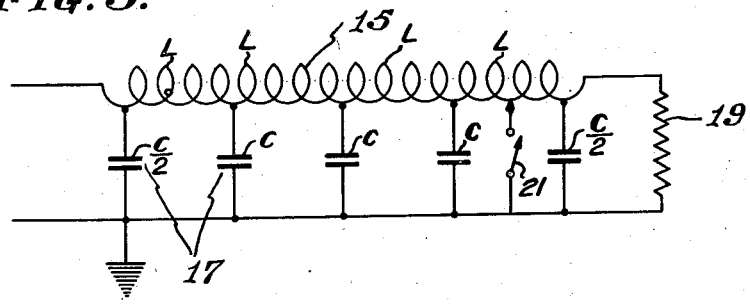
Inventor
William D. Hershberger
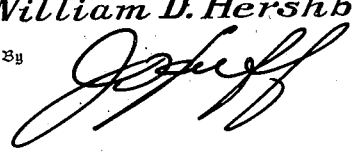
Attorney Patented Apr. 19, 1949

2,467,670

UNITED STATES PATENT OFFICE 2,467,670

RADIO PULSE ECHO SYSTEM USING DOPPLER EFFECT

William D. Hershberger, Haddonfield, N. J., assignor to Radio Corporation of America, a corporation of Delaware Application July 28, 1939, Serial No. 287,172

6 Claims. (Cl. 343—8)

This invention relates to a radio pulse echo system using the Doppler effect and more particularly to a radio pulse system in which a reference frequency is obtained by applying some of the transmitted energy to an electrical delay network.

Radio pulse echoes are used to measure distances: A sharply defined pulse of radio frequency energy is radiated at the velocity of light; the time required for the pulse to travel to a reflecting object or discontinuity in the medium and back to the point of original transmission is noted. Since the velocity is known, the distance may be determined. If there is relative motion between the transmitter-receiver and the reflecting surface, a Doppler effect will exist. The frequency of the Doppler effect indicates the velocity of the relative motion. Such indications may be used to indicate the rate of climb or rate of descent of an aircraft or the rate of drift as disclosed in copending application Serial No. 232,631, filed September 30, 1938, now Patent No. 2,423,023, issued June 24, 1947, entitled "Obstacle detection by radio waves."

In order that the Doppler effect be observed, it is necessary to have a reference or standard frequency. In the event that the system employs a master oscillator, it becomes a relatively simple matter to beat the echo with the master oscillator and to determine the beat frequency. However, in many of the pulse echo systems, especially for aircraft, where the weight of the apparatus is of prime importance, master oscillators are not used. Furthermore, the master oscillator may interfere with the reflected signals. In systems which do not employ a continuously operating master oscillator, Doppler effects are sometimes observed when an echo is received simultaneously from two surfaces, one of which is in motion relative to the other, in which case the echoes from the two surfaces interfere with each other. While Doppler effects of this type are occasionally noted, they are not sufficiently reliable for most practical applications.

As one of the objects of the present invention, means are provided whereby Doppler effects may be observed in a radio pulse echo system. Another object is to provide means for obtaining a reference frequency so that Doppler effects may be indicated in a radio pulse echo system which does not employ a continuously operating master oscillator. An additional object is to provide a radio pulse echo system with an electrical network designed to reflect a small and substantially constant portion of the transmitted pulse energy.

The invention will be described by reference to the accompanying drawing, in which Figure 1 is a schematic circuit diagram of one embodiment of the invention; Figures 2 and 2a are respectively front and side elevational views of an electrical network employed in the invention; and Figure 3 is a schematic diagram representing the equivalent circuit of the device shown in Figures 2 and 2a.

Referring to Fig. 1, a pulse transmitter 1 and a pulse receiver 3 are suitably connected to an antenna 5. The pulse transmitter and receiver are also connected to an indicator 7. Since this type of system is well known to those skilled in the art, no detailed description is given in the instant application, but reference is made to U. S. Patent 1,585,591 granted on May 18, 1926, to Heinrich Löwy, and to an article by G. Breit and M. A. Tuve, published in September 1926 in Physical Review, vol. 28, pp. 554 to 575. Reference is also made to copending application Serial No. 184,354, filed January 11, 1938, entitled Signalling system, now Patent No. 2,401,717, issued June 4, 1946, to Irving Wolff and William D. Hershberger.

The antenna is also connected to a network S. This network is a time delay circuit including a plurality of filter sections L/2—C, L1—C1, L2—C2, L3—C3, L/2—R. These filters include a plurality of junctions J0, J1, J2, etc., and finally a terminating resistance R. While filter networks usually are matched to each other and to the terminating resistance to avoid reflections, the present network is mismatched with respect to each section and the terminating resistance to thereby cause reflections. It is desirable that the echo level from the time delay network S be maintained low and at the same time the entire echo should preferably be sustained. This requirement is not very difficult to meet in practice because the pulse includes a frequency spectrum which may lie partly outside the pass band of the network S and thus aids in obtaining sustained echo signals of substantially uniform amplitude.

In practice, a plurality of separate sections of filter may represent unnecessary complication. It is therefore proposed to construct the time delay network in accordance with the illustration, Figures 2 and 2a. In this arrangement, any suitable insulated mandrel 9 is wound with a length of wire which is terminated in a resistor 11. The mandrel 9 is placed within a metallic cylinder 13. If the mandrel and the cylinder are concentrically arranged, a smooth transmission line will result. If the mandrel is arranged eccentrically, a lumped transmission line with a definite cut-off frequency results.

The electrical characteristics of the device are represented by the schematic diagram of Figure 3 in which the winding is represented by the reference numeral 15, the elementary capacities from the winding to the shield by the capacitors 17, and the terminating resistor by the reference numeral 19. It should be understood that the winding may be tapered and may be positioned within the cylinder 13 to obtain the desired characteristics. By way of example, for a cut-off frequency of $600 \times 10^6$ cycles per second and a surge impedance of 1000 ohms, the low pass filter may include the following constants: the inductance L of each of the filter sections will equal ½ microhenry, and the capacitors C connected across the line intermediate each of the inductive elements L will equal ½ micromicrofarad. As indicated in the drawing, the capacitors C/2 connected across each end of the line will be equal to ¼ micromicrofarad. It should be understood that the echo from the line may be made to appear at any desired time interval, or at any point on the cathode ray oscilloscope trace if one is used, by short-circuiting the smooth line at any desired point, for example, as indicated by the switch 21.

Thus, the invention has been described as a pulse echo device in which Doppler effects are obtained by applying a portion of the outgoing signal to a time delay network. The time delay network is so arranged that it reflects a portion of the applied signal as a sustained wave of substantially constant frequency and amplitude. This wave combines with a reflected wave of a different frequency to thereby indicate a beat frequency from which relative motion may be determined.

I claim as my invention:

1. In combination, a radio pulse transmitter for producing periodically recurring pulses, means for radiating said pulses from said transmitter, a pulse receiver, means for picking up said radiated pulses after reflection from an object and supplying them to said receiver, means comprising a time delay network for supplying said periodically produced pulses to said receiver with a delay determined by said network, said network being designed to produce a delay such that at the receiver the reflected pulses and the produced pulses delayed by said network overlap in time whereby said delayed pulses function as a reference signal for pulses reflected from an object, and means comprising an indicator connected to said receiver for producing a beat frequency indication in response to object-reflected pulses and network-delayed pulses appearing simultaneously at said receiver.

2. In combination, a pulse transmitter for producing and transmitting periodically recurring pulses, a pulse receiver, means for picking up said transmitted pulses after reflection from an object and supplying them to said receiver, a time delay network with a reflecting termination for reflecting pulses applied thereto, means for supplying pulses from said transmitter to said network whereby they are reflected back through the network, said network being designed to produce a delay such that at the receiver the reflected pulses and the produced pulses delayed by said network overlap in time, means for supplying to the receiver said pulses reflected from the network whereby they function as a reference signal for received pulses that have been reflected from an object, and means comprising an indicator connected to said receiver for producing a beat frequency indication in response to object-reflected pulses and network-reflected pulses appearing simultaneously at said receiver.

3. In combination, a radio pulse transmitter for producing periodically recurring pulses, means for radiating said pulses from said transmitter, a pulse receiver, means for picking up said radiated pulses after reflection from an object and supplying them to said receiver, a time delay network that is designed to reflect pulses applied thereto, means for supplying pulses from said transmitter to said network whereby they are reflected back through the network, said network being designed to produce a delay such that at the receiver the reflected pulses and the produced pulses delayed by said network overlap in time, means for supplying to the receiver said pulses reflected from the network whereby they function as a reference signal for received pulses that have been reflected from an object, and means comprising an indicator connected to said receiver for producing a beat frequency indication in response to object-reflected pulses and network-reflected pulses appearing simultaneously at said receiver.

4. The invention according to claim 3 wherein said transmitter and receiver have a common antenna and wherein the non-reflecting end of said delay network is connected to receive a portion of the pulse energy applied to said antenna.

5. The invention according to claim 3 whereby said delay network comprises a plurality of mismatched filter sections.

6. The invention according to claim 3 in which the time delay network includes a plurality of filter sections so matched to each other and to a terminating resistance that an applied pulse of radio frequency energy is reflected substantially continuously to thereby form a reference current of substantially constant frequency.

WILLIAM D. HERSHBERGER.

REFERENCES CITED

The following references are of record in the file of this patent:

UNITED STATES PATENTS

| Number | Name | Date |
|---|---|---|
| 1,874,196 | Lamson | Aug. 30, 1932 |
| 1,924,156 | Hart | Aug. 29, 1933 |
| 2,085,418 | Crosby | June 29, 1937 |
| 2,134,716 | Gunn | Nov. 1, 1938 |
| 2,193,361 | Rice | Mar. 12, 1940 |
| 2,253,589 | Southworth | Aug. 26, 1941 |
| 2,407,198 | Wolff | Sept. 3, 1946 |
| 2,412,631 | Rice | Dec. 17, 1946 |
| 2,415,095 | Varian | Feb. 4, 1947 |